United States Patent [19]
Salmon et al.

[11] Patent Number: 5,378,445
[45] Date of Patent: Jan. 3, 1995

[54] PREPARATION OF LITHIUM HEXAFLUOROPHOSPHATE SOLUTIONS

[75] Inventors: Dennis J. Salmon, Gastonia; D. Wayne Barnette, Bessemer City; Rebecca A. Barnett, Maiden, all of N.C.

[73] Assignee: FMC Corporation, Philadelphia, Pa.

[21] Appl. No.: 172,690

[22] Filed: Dec. 23, 1993

[51] Int. Cl.⁶ .................. C01B 25/10; H01M 6/14; H01M 6/16

[52] U.S. Cl. .................. 423/301; 429/194; 429/198

[58] Field of Search .............. 423/301; 429/194, 197, 429/198

[56] References Cited

U.S. PATENT DOCUMENTS

| | | | |
|---|---|---|---|
| 3,380,803 | 4/1968 | Jache et al. | 423/301 |
| 3,607,020 | 9/1971 | Smith | 423/301 |
| 3,654,330 | 4/1972 | Wiesboeck | 423/301 |
| 4,880,714 | 11/1989 | Bowden | 429/198 |

FOREIGN PATENT DOCUMENTS 290889 10/1983 Germany.
175216  6/1992 Japan.

*Primary Examiner*—Wayne Langel
*Attorney, Agent, or Firm*—Charles C. Fellows; Robert L. Andersen

[57] ABSTRACT

A process for preparing solutions of lithium hexafluorophosphate comprising reacting, under basic conditions, a lithium salt with a salt selected from sodium, potassium, ammonium, or organo ammonium hexafluorophosphate salt in a low boiling, non-protic organic solvent to produce a solution of lithium hexafluorophosphate and a precipitated sodium, potassium, ammonium, or organo ammonium salt containing the anion of the reactant lithium salt.

7 Claims, No Drawings

PREPARATION OF LITHIUM HEXAFLUOROPHOSPHATE SOLUTIONS

This invention concerns a manufacturing method for high purity, battery quality, lithium hexafluorophosphate and high purity, lithium hexafluorophosphate solutions suitable for use in high energy batteries.

The high voltages of primary lithium batteries and the charging voltage for secondary lithium battery designs place a demanding requirement on the electrolyte salt chosen for these battery applications. The salt must have sufficient electrochemical stability to avoid reduction reactions, sufficient chemical stability to avoid reaction with the other battery components and sufficient solubility in the electrolyte solvent (or polymeric matrix) to allow sufficient conductivity for the discharge of primary batteries and for the charging of secondary batteries.

Lithium hexafluorophosphate meets the electrochemical and conductivity requirements for many battery applications. However, the salt is chemically very reactive and difficult to manufacture and purify. The use of this salt as the electrolyte salt in a lithium battery can lead to reactions with other battery components and thermal decomposition of the salt. Lithium hexafluorophosphate prepared from aqueous solutions of hexafluorophosphoric acid and a basic lithium salt, such as lithium hydroxide or lithium carbonate, can hydrolyze to form three anions $PO_2F_2-$, $HPO_3F-$, and $PO_4$. Thus, the precipitated lithium hexafluorophosphate salt prepared from aqueous solutions will contain these undesirable contaminants. These hydrolysis reactions will yield acids which catalyzes the hydrolysis reaction. The poor thermal stability of lithium hexafluorophosphate makes removal of water, in order to produce anhydrous lithium hexafluorophosphate, extremely difficult. Consequently lithium hexafluorophosphate prepared by aqueous routes are generally unsuitable for battery applications. The potential exists for acid catalyzed decomposition reactions with other solvents.

To avoid the problems of dealing with hydrolysis of the hexafluorophosphate anion in aqueous solutions, processes were developed whereby lithium hexafluorophosphate was produced by reactions of suspended lithium fluoride and gaseous phosphorous pentafluoride in organic solvents. The difficulties of these processing methods include handling extremely reactive, expensive phosphorous pentafluoride gas and difficult isolation of the non-solvated salt from the organic solution. The reaction of lithium halides with phosphorous pentafluoride in anhydrous hydrofluoric acid solvent has been described. Descriptions of further processing to reduce cost and increase purity are revealed. These procedures leave a residual hydrofluoric acid contained in the solid product which cannot be completely removed and may be detrimental to battery performance.

Lithium hexafluorophosphate is extremely hygroscopic which has made its manufacture and purification difficult. One preparation method reacts lithium hydride (LiH) and phosphorus pentachloride ($PCl_5$) in the presence of hydrofluoric acid anhydride. The process starts with solid $PCl_5$ which always contains some moisture, sulfate ions, iron and lead which impurities contaminate the electrolyte; unfortunately even relatively small amounts of these impurities are unacceptable in electrolytes. Another method reacts a lithium halide and $PF_6$ in hydrofluoric acid anhydride. this process, employing the solid gas reaction of porous LiF—HF with $PF_6$ gas, avoids the moisture problems of earlier processes; however high purity $PF_5$ gas is extremely expensive. The process of published Japanese published application Hei 4-175216 (1992) claims to overcome the high $PF_5$ costs by reacting $PCl_5$ and hydrofluoric acid at high $PF_5$ costs by reacting $PCl_5$ and hydrofluoric acid at $-20°$ C. or lower and an HF solution, $HPF_6$, is formed. This resultant reaction solution is warmed up to $-10°$ C. to $20°$ C. to produce high purity $PF_5$ gas. The $PF_5$ gas is introduced carefully into a solution of LiF—HF to produce $LiPF_6$ at $-30°C$. The $LiPF_6$ precipitates as 2–3 mm particles which are recovered using usual methods of recovery. A process is known in which $NH_4PF_6$ is reacted with LiBr in dimethoxyethane (DME) to form a $LiPF_6$.DME complex. The product has high purity but the DME is very difficult to remove which limits the product to uses where the DME can be tolerated.

Processing to avoid contamination by acidic components has been described. U.S. Pat. No. 4,880,714 discloses the reaction of a salt with a cation containing an adduct of a proton and a Lewis base and an anion consisting of hexafluorophosphate in an ether with a lithium base to form a solution from which the $LiPF_6$-ether complex can be isolated. Due to difficulties in removing the ether from the complex, the complex must be incorporated directly into the battery electrolyte and, thus, this product is not useful for battery designs not containing the ether.

The reaction of potassium hexafluorophosphate with lithium bromide in acetonitrile is described to yield a potassium bromide precipitate, which is filtered, and a solution of lithium hexafluorophosphate in acetonitrile recovered. Removal of acetonitrile, extraction by a halogenated hydrocarbon solvent, and filtration of impurities yields a solution from which crystalline $[Li(CH_3CN)_4 PF_6]$ can be isolated by removal of the organic solvent. This product is limited to battery applications containing acetonitrile as an electrolyte component and is not generally suitable for batteries.

The present invention provides a process which overcomes the problems for producing battery quality lithium hexafluorophosphate solutions by reacting, under basic conditions, lithium salts with alkali metal or ammonium or organoammonium salts of hexafluorophosphoric acid in an organic solvent. In particular embodiments of this invention, ammonia or other volatile amines are added to increase the rate of the reaction as well as to precipitate acidic contaminants from the reactant hexafluorophosphate salt. A variety of organic solvents can be used in the processing, and in preferred embodiments low boiling organic solvents are used so that the initial solvent can be removed in the presence of another higher boiling solvent to prepare the final battery electrolyte solutions. The advantages of this process include avoidance of acidic conditions which can yield undesired decomposition reactions and avoidance of the thermally unstable solid salt; for example, by saturating the reaction solution with anhydrous ammonia. The reaction is optionally, beneficially conducted in the presence of an amine which can be easily removed when the reaction is completed; for example by use of methyl or ethyl amine.

A variety of reactant lithium salts useful in practicing this invention include but are not limited to lithium chloride, lithium bromide, lithium perchlorate, lithium tetrafluoroborate, lithium nitrate, lithium acetate, lithium benzoate and the like. Choice is usually governed by solubility of the by-product salt formed from the cation of the hexafluorophosphate salt and the anion of the lithium salt. The lithium salt must also have sufficient solubility to allow the reaction to proceed. In a similar fashion, the choice of cation in the reactant hexafluorophosphate salt is generally governed by the solubility of the resultant by-product salt.

Salts of hexafluorophosphoric acid useful in practicing this invention include, but are not limited to, potassium hexafluorophosphate, sodium hexafluorophosphate, ammonium hexafluorophosphate and organoammonium hexafluorophosphate compounds of the formula $R_4NPF_6$ wherein R is selected from alkyl groups of 1 to 8, preferably 1 to 4, carbon atoms and aryl groups of 6 to 12 carbon atoms.

Solvents useful in practicing this invention are low-boiling non-protic organic solvents, having low solubility of the sodium, potassium, ammonium, or organo ammonium salt containing the anion of the reactant lithium salt and high solubility of the lithium hexafluorophosphate which include, but are not limited to, acetonitrile, dimethylcarbonate, diethylcarbonate, methylene chloride and dimethoxyethane or other low boiling non-protic solvents. These low boiling solvents can be mixed with high viscosity solvents such as ethylene carbonate or propylene carbonate, after which the low boiling solvent is removed. The viscosity of these materials when dissolved in a high viscosity solvent may be modified (see draft) such as dimethyl carbonate or diethylcarbonate. The last few percent of the reaction solvent is difficult to remove from the hexafluorophosphate product and a wiped film distillation apparatus has been found useful for removing the acetonitrile.

The reaction as generally conducted at room temperature or slightly above. High temperatures are avoided to avoid decomposing the hexafluorophosphate salts. The reaction is slow and may take 24 hours or more to complete. Ammonia is added at a rate to provide continuous saturation of the atmosphere in the reaction zone with ammonia. The reaction zone may be constructed of any convent material inert to the reactants and products.

The reactants, LiCl and $KPF_6$, are employed in substantially stochiometric amounts with a slight excess of LiCl generally being employed. Anhydrous ammonia is used in substantial amounts as it is desirable to keep the reaction solution saturated with ammonia. Stopping the ammonia addition apparently stops the reaction. The reaction is ordinarily done under ambient pressure and temperature conditions. Reaction under pressure can be done; the reaction is best conducted in an ammonia saturated atmosphere. Addition of the ammonia causes a small exotherm, otherwise the reaction is done under ambient temperature and pressure conditions. Ammonia advantageously is added throughout the reaction period.

Battery quality electrolytes based on $LiPF_6$ dissolved in organic solvents are useful battery electrolytes. The use of $NH_3$ permits use to lithium chloride (LiCl); without the presence of $NH_3$ the $KPF_6$—LiCl reaction does not proceed. Ammonia dissolves the $LiPF_6$ product and shifts the reaction to completion. Lithium bromide (LiBr) can be used in place of LiCl but this results in KBr being dissolved in the solvent. LiCl is not so soluble in the solvents so the product $LiPF_6$ is purer. After completion of the reaction, $NH_3$ is removed from the reaction zone or mixture as a gas. Thus, $NH_3$ is preferred over amines because neither $NH_3$ or amines are wanted in the electrolyte. The reaction mixture is recovered by ordinary means such as filtering off by-products and vacuum removal of the ammonia.

The following examples further illustrate the invention.

EXAMPLE 1.

LiPF6 in Propylene Carbonate

Solution A: 553 g recrystallized $KPF_6$ was dissolved in 3000 cc $CH_3CN$ at room temperature.

Solution B: 127 g LiCl was added to 400 cc $CH_3CN$ at room temperature.

Solution A was added to solution B at room temperature. Ammonia was then sparged into mixture for 24 hours. Solution was filter to remove KCl. Solution was mixed with propylene carbonate and the acetonitrile was removed by evaporation. Product contained 0.1% KCl.

Comparison Example A

Example 1 was repeated without the ammonia sparge. No reaction occurred.

EXAMPLE 2.

LiPF6 in Mixed Solvents

Example 1 was repeated. Following evaporative removal of $CH_3CN$ a second solvent is added to the $LiPF_6$/PC solution. The second solvent could be dimethylcarbonate, diethylcarbonate, ethylene carbonate.

EXAMPLE 3.

LiPF6 in PC using LiBr

Example 1 was repeated substituting LiBr for LiCl. The result was a product containing 3% KBr.

EXAMPLE 4.

LiPF6 in PC.

Example 1 was repeated substituting LiBr for LiCl and without the ammonia sparge. The resulting product was discolored due to acid-catalyzed decomposition.

What is claimed is:

1. A process for preparing solutions of lithium hexafluorophosphate comprising reacting, under basic conditions, a lithium salt with a salt selected from the group consisting of sodium, potassium, ammonium, and organo ammonium hexafluorophosphate in a low boiling, non-protic organic solvent in a reaction zone that is continuously saturated with a compound selected from the group consisting of anhydrous ammonia, methyl amine and ethyl amine to produce a solution of lithium hexafluorophosphate and a precipitated sodium, potassium, ammonium, or organo ammonium salt containing the anion of the reactant lithium salt.

2. The process of claim 1 wherein the organic solvent is selected from acetonitrile, dimethylcarbonate, diethylcarbonate, dimethoxyethane and methylene chloride.

3. The process of claim 1 wherein the reactant lithium salt is selected from the group consisting of lithium chloride, lithium bromide, lithium perchlorate, lithium nitrate, lithium acetate, lithium tetrafluoroborate and lithium benzoate.

4. The process of claim 1 wherein the reactant organo hexafluorophosphate salt is a tetraalkyl ammonium hexafluorophosphate of the formula $R_4NPF_6$ wherein R is selected from the group consisting of alkyl groups of 1 to 8 carbon atoms.

5. The process of claim 1 further characterized by recovering the lithium hexafluorophosphate from the solution by filtering the original product solution, adding a higher boiling solvent, selected from the group consisting of ethylene carbonate and propylene carbonate, to the initial product solution of lithium hexafluorophosphate and removing the initial low boiling solvent and ammonia or amine by heating under vacuum.

6. A process for preparing solutions of lithium hexafluorophosphate comprising reacting, under basic conditions, potassium hexafluorophosphate salt with lithium chloride in acetonitrile to produce a solution of lithium hexafluorophosphate and precipitated potassium chloride while keeping the solution basic by saturating the solution with anhydrous ammonia.

7. The process of claim 6 further characterized by recovering the lithium hexafluorophosphate from the solution by filtering the original product solution, adding a higher boiling solvent, selected from the group consisting of ethylene carbonate and propylene carbonate, to the initial product solution of lithium hexafluorophosphate and removing the initial low boiling solvent and ammonia by heating under vacuum.

* * * * *